US007013792B2

(12) United States Patent
Yamaguchi

(10) Patent No.: US 7,013,792 B2
(45) Date of Patent: Mar. 21, 2006

(54) ACTUATOR PROVIDED WITH LOCKING MECHANISM

(75) Inventor: Hiroyoshi Yamaguchi, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 103 days.

(21) Appl. No.: 10/830,343

(22) Filed: Apr. 22, 2004

(65) Prior Publication Data

US 2004/0211313 A1 Oct. 28, 2004

(30) Foreign Application Priority Data

Apr. 22, 2003 (JP) ............................ 2003-117326

(51) Int. Cl.
*F15B 15/26* (2006.01)
(52) U.S. Cl. ..................... 92/15; 92/14; 92/18; 92/19
(58) Field of Classification Search ............... 92/14, 92/15, 18, 19
See application file for complete search history.

(56) References Cited

U.S. PATENT DOCUMENTS

| | | | |
|---|---|---|---|
| 2,917,277 A * | 12/1959 | Pine ............................... | 92/19 |
| 2,967,512 A | 1/1961 | Born ............................. | 121/40 |
| 3,251,278 A * | 5/1966 | Royster .......................... | 92/18 |
| 4,471,944 A | 9/1984 | Leray et al. ................... | 254/93 |
| 5,002,318 A | 3/1991 | Witter .......................... | 285/302 |
| 5,205,203 A * | 4/1993 | Rossato .......................... | 92/19 |
| 6,305,889 B1 | 10/2001 | Blessing et al. ............ | 411/353 |
| 2001/0002524 A1 | 6/2001 | Espinosa ..................... | 52/293.3 |

FOREIGN PATENT DOCUMENTS

| | | |
|---|---|---|
| JP | 2000-1136 | 1/2002 |
| JP | 2002-29367 | 1/2002 |

OTHER PUBLICATIONS

Search Report dated Oct. 4, 2004 conducted by the European Patent Office from corresponding European Patent Application No. EP 04 00 9413.

* cited by examiner

Primary Examiner—Thomas E. Lazo
Assistant Examiner—Igor Kershteyn
(74) Attorney, Agent, or Firm—Ohlandt, Greeley, Ruggiero & Perle LLP.

(57) ABSTRACT

A piston rod is formed in a diameter smaller than an inner diameter of a hollow cylinder. The piston rod is inserted in the cylinder so as to be relatively movable in an axial direction of the cylinder. A locking mechanism comprises a first surface provided on the inner surface of the cylinder, a plurality of second surfaces arranged in an axial direction of the piston rod and parallel to one another, and a locking member. The first surface is so inclined that the inside diameter of the cylinder gradually increases toward one end of the cylinder. Each second surface is so inclined that the diameter of the piston rod gradually increases to the one end of the piston rod. The locking member is held between the first surface and any one of the second surfaces to lock relative movement of the piston rod with respect to the cylinder.

10 Claims, 6 Drawing Sheets

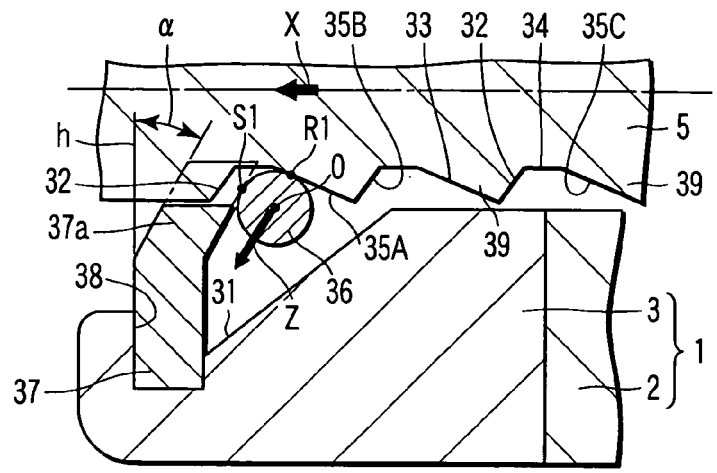
F I G. 9
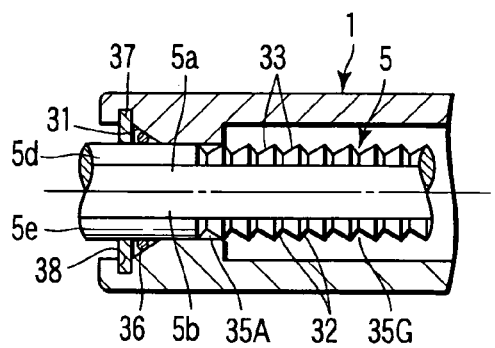
F I G. 10
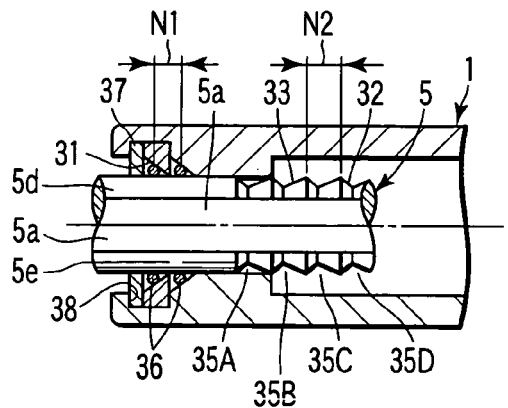
F I G. 11

ACTUATOR PROVIDED WITH LOCKING MECHANISM

CROSS-REFERENCE TO RELATED APPLICATIONS

This application is based upon and claims the benefit of priority from prior Japanese Patent Application No. 2003-117326, filed Apr. 22, 2003, the entire contents of which are incorporated herein by reference.

BACKGROUND OF THE INVENTION

1. Field of the Invention

The present invention relates to an actuator for use, for example, in a vehicle, particularly to an actuator provided with a locking mechanism capable of locking a piston rod with respect to a cylinder.

2. Description of the Related Art

An actuator is disposed, for example, in a safety device disposed in a vehicle in order to enhance safety of crews at the time of collision. The actuator is also disposed in the safety device or the like disposed in the vehicle in order to relax an impact applied to a pedestrian in a case where the vehicle collides with the pedestrian.

For example, when a seat belt is not attached to the crew in a normal state at the time of the collision of the front surface of an automobile, the crew fastened by the seat belt has a downward slipping posture, and a lower back belt is detached from pelvises. A so-called submarine phenomenon sometime occurs. When the submarine phenomenon occurs, crew's buttocks or lower limbs move forwards/downwards, and there is a possibility of secondary collision of the lower limbs with an instrument panel before the crew. As a device for suppressing the submarine phenomenon, a seat device has heretofore been known for operating an actuator to mechanically lift up a seat tip portion, when a sensor disposed on the tip portion of the automobile detects the collision. This constitution is described, for example, in Jpn. Pat. Appln. KOKAI Publication No. 2000-1136.

Moreover, when the pedestrian collides with the front surface of the running automobile, pedestrian's lower half body hits a bumper as the tip portion of the automobile, and therefore the pedestrian is thrown up onto a hood of the automobile in many cases. In this case, the pedestrian sometimes bumps his head or the like against the hood. Therefore, as a device for relaxing the impact at the time when the pedestrian is thrown up onto the hood, a hood device is known for operating the actuator to push up the hood by a predetermined amount, when the sensor disposed on the tip portion of the automobile detects the collision. That is, when the hood is pushed upwards, a gap is made between the hood and each device in an engine room. Therefore, when the pedestrian is thrown upwards and collides with the hood, the hood is deformed to absorb a part of energy by the impact. This constitution is described, for example, in Jpn. Pat. Appln. KOKAI Publication No. 2002-29367.

Additionally, in the actuator disposed in the above-described safety device, an output of a gas generation device is set in consideration of a collision speed or crew's weight. However, when the collision speed is high, or when the crews are heavy, an input load increases with respect to an operation power of the gas generation device, and a piston rod does not take a full stroke in some case.

In the conventional actuator disposed in the above-described safety device, relative movement of the piston rod with respect to a cylinder is locked in a state in which the piston rod takes the full stroke from one end of the cylinder. Moreover, once the piston rod completely protrudes from one end of the cylinder, the piston rod is held in the locked state.

Therefore, in the technique described in Patent Document 1 or 2, the relative movement of the piston rod with respect to the cylinder is not locked in a case where the piston rod does not take the full stroke because of the above-described factors or the like. Therefore, the sheet tip portion cannot be held in the lifted-up state, or the hood cannot be hold in the pushed-up state.

For this reason, in a hood device, seat device, buckle pretensioner or the like, there has been a demand for an actuator in which relative movement of a piston rod with respect to a cylinder can be locked in the vicinity of a position where the piston rod is stopped even in a case where the piston rod does not take its full stroke at the time of collision of an automobile.

BRIEF SUMMARY OF THE INVENTION

An object of the present invention is to provide an actuator in which relative movement of a piston rod with respect to a cylinder can be locked in the vicinity of a position where the piston rod stops even in a case where the piston rod does not take its full stroke.

An actuator of the present invention based on a first viewpoint comprises: a hollow cylinder; a piston rod which is formed in a diameter smaller than an inner diameter of the cylinder and which is inserted into the cylinder in such a manner that relative movement is possible in an axial direction of the cylinder; and a locking mechanism which locks the relative movement of the piston rod with respect to the cylinder in a state in which one end of the piston rod protrudes from one end of the cylinder. The locking mechanism comprises: a first surface provided on an inner surface of the cylinder and so inclined that the inside diameter of the cylinder gradually increases toward one end of the cylinder; a plurality of second surfaces arranged in an axial direction of the piston rod and parallel to one another, each second surface being so inclined that the diameter of the piston rod gradually increases to the one end of the piston rod; and a locking member held between the first and second surfaces to lock the relative movement of the piston rod with respect to the cylinder.

According to the constitution, the second surfaces are arranged in the axial direction of the piston rod and parallel to one another. And each second surface is so inclined that the diameter of the piston rod gradually increases to the one end of the piston rod. Therefore, when the one end of the piston rod protrudes from the end of the cylinder, and even if the piston rod does not take its full stroke, the locking member is held between the first surface and any of the plurality of second tapered surfaces to lock the relative movement of the piston rod with respect to the cylinder.

According to the constitution, there can be the actuator capable of locking relative movement of a piston rod with respect to a cylinder in the vicinity of a position where the piston rod has stopped even in a case wherein the piston rod does not take its full stroke.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a sectional view showing the actuator according to a second embodiment of the present invention in the vicinity of the C ring in the state in which the piston rod is locked by the locking mechanism;

FIG. 10 is a sectional view showing a part of a front end of the actuator according to a third embodiment of the present invention;

FIG. 11 is a sectional view showing a part of the front end of the actuator according to a fourth embodiment of the present invention;

DETAILED DESCRIPTION OF THE INVENTION

In first to seventh embodiments, one end of a cylinder or a piston rod (left end in FIGS. 1 to 3, 6 to 11) will be described as a front end (tip), and the other end (right end in FIGS. 1 to 3, 6 to 11) will be described as a rear end.

A first embodiment of the present invention will be described hereinafter with reference to FIGS. 1 to 8.

Figure 1:
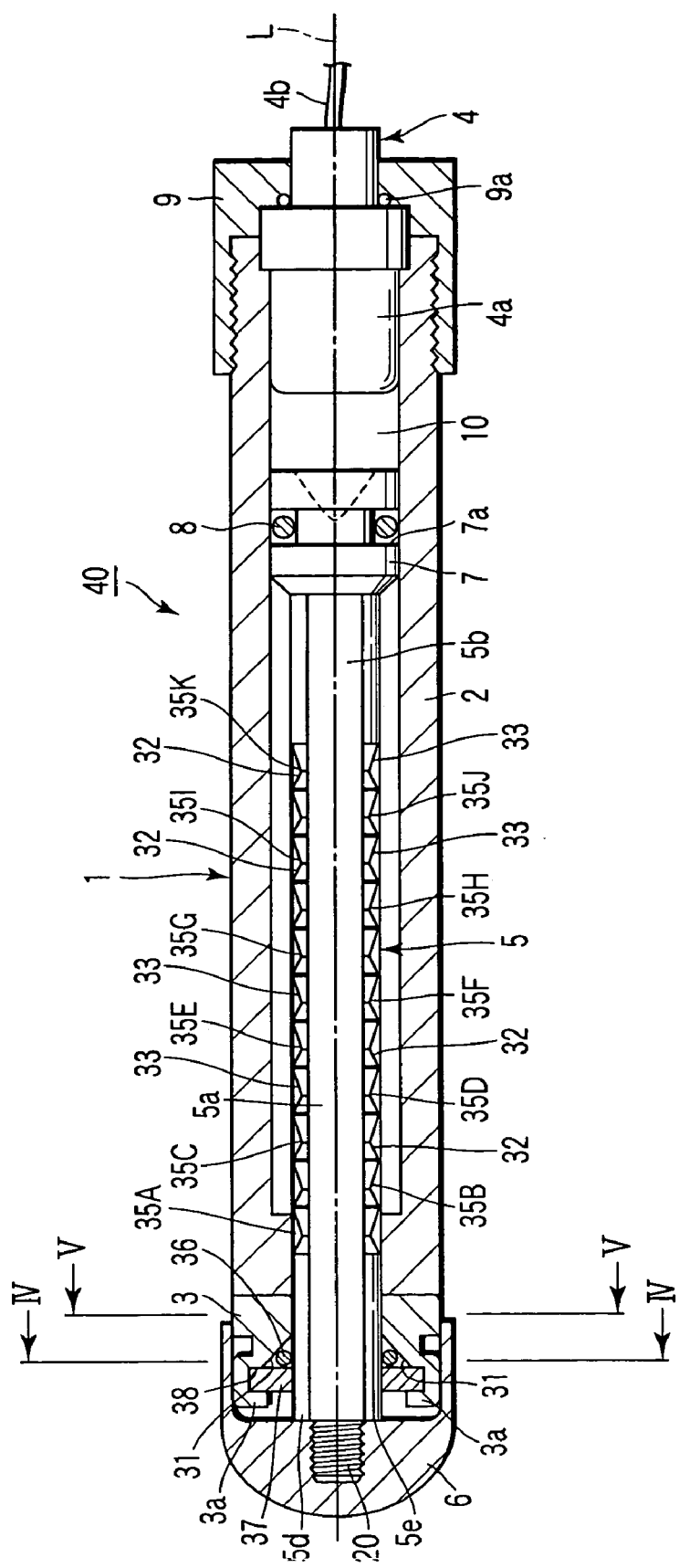
FIG. 1 is a sectional view showing an actuator according to a first embodiment of the present invention in a state in which a piston rod is inserted into a cylinder.
Figure 2:
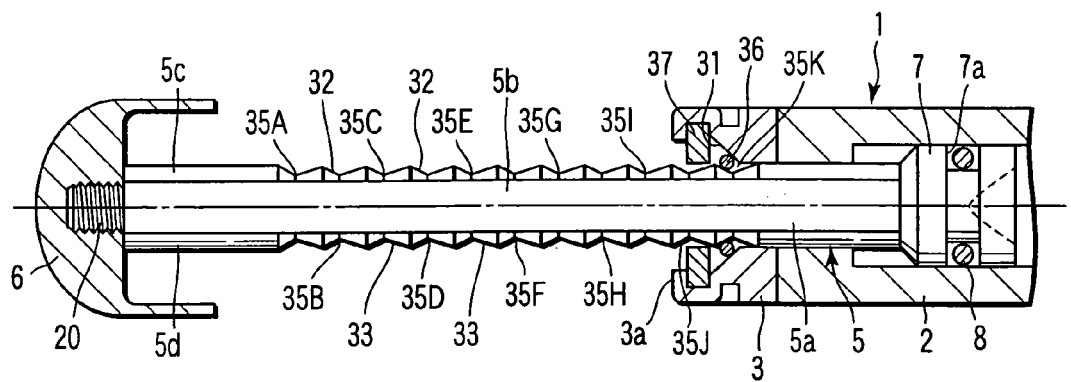
FIG. 2 is a sectional view showing a part of the actuator of FIG. 1 in a state in which the piston rod protrudes from the cylinder.

As shown in FIG. 1, an actuator 40 of the first embodiment comprises a hollow cylinder 1 including a hollow casing 3, a gas generation device 4 which is a power generation device, a piston rod 5 including a tip cap 6, a piston 7 and the like. As shown in FIG. 2, the actuator 40 is constituted in such a manner that the front end of the piston rod 5 protrudes from the front end of the cylinder 1 by ignition of the gas generation device 4.

In detail, the cylinder 1 includes a cylinder main body 2 and the casing 3 disposed in a front end portion of the cylinder main body 2. The gas generation device 4 is disposed in a rear end portion of the cylinder main body 2. The gas generation device 4 includes a gas generation section 4a in which gunpowder for generating gas is stored, and a lead wire 4b for igniting a gas generation body (not shown) stored in the gas generation section 4a extends from this gas generation section 4a. The gas generation device 4 is disposed in the rear end portion of the cylinder 1 in a state in which the gas generation section 4a is fitted into the rear end portion of the cylinder main body 2. The casing 3 is a part of the cylinder 1, functions as a cap of the cylinder 1, and also functions as a part of a locking mechanism 30 described later. This casing 3 will be described later.

The gas generation device 4 is covered with a cap-shaped support member 9 in a state in which the lead wire 4b extends to the outside. Moreover, when the support member 9 is meshed with the rear end portion of the cylinder 1, the gas generation device 4 is fixed to the cylinder 1. It is to be noted that reference numeral 9a in FIG. 1 shows an annular seal material. The power generation device is not limited to the gas generation device 4, and, for example, an accumulator or the like may also be used.

Figure 3:
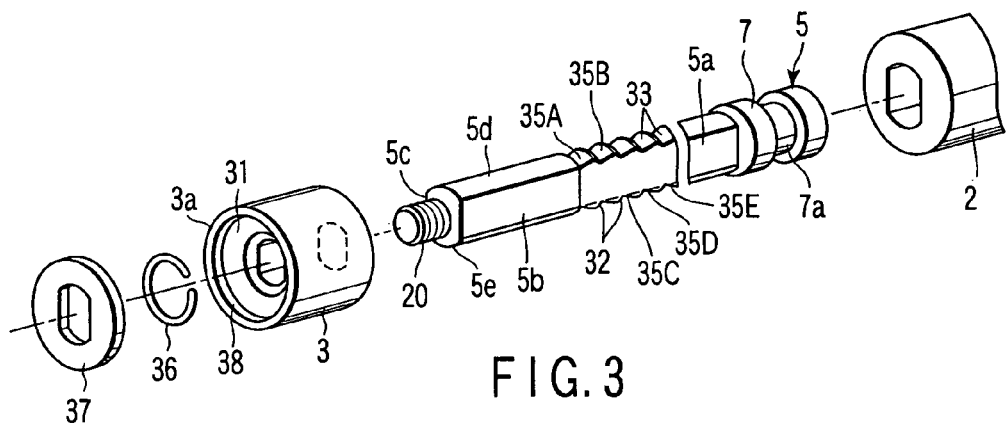
FIG. 3 is an exploded perspective view showing the actuator of FIG. 1.

As shown in FIGS. 1 to 3, the solid piston rod 5 having an elongated rod shape comprises a rod main body 5a and piston 7. The piston rod 5 is formed in a diameter smaller than an inner diameter of the cylinder 1. A male screw portion 20 is disposed on the front end portion of the rod main body 5a, and the tip cap 6 is meshed with the male screw portion 20. The piston 7 movable relatively in a direction of an axial line L (the same as the axial line of the piston rod 5) of the cylinder 1 is position in the rear end portion of the rod main body 5a, and is formed integrally with the rod main body 5a.

Figure 4:
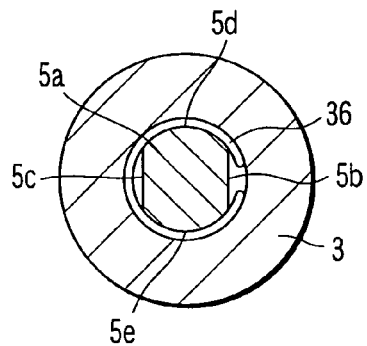
FIG. 4 is a sectional view showing the actuator along a line IV—IV in FIG. 1.
Figure 5:
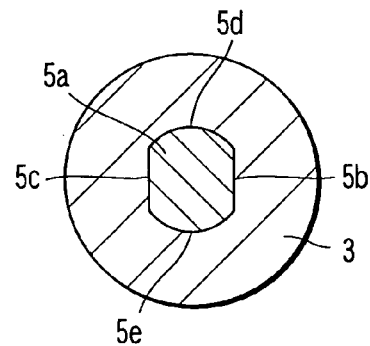
FIG. 5 is a sectional view showing the actuator along a line V—V in FIG. 1.

As shown in FIG. 3 or the like, a plurality of locking grooves 35A to 35K are arranged the axial line L direction of the piston rod 5 and parallel to one another in outer peripheral surface of the rod main body 5a. In the embodiment, the rod main body 5a is cut or worked otherwise to form the plurality of locking grooves 35A to 35K integrally with the rod main body 5a. These locking grooves 35A to 35K are constituting elements constituting the locking mechanism 30 described later. As shown in FIGS. 4 and 5, the rod main body 5a includes a pair of elongated flat surfaces 5b, 5c parallel to each other, and a pair of elongated curved surfaces 5d, 5e connecting opposite end portions of the elongated flat surfaces 5b, 5c, and is formed in double-D-shaped. That is, the locking grooves 35A to 35K are disposed in the elongated curved surfaces 5d, 5e in such a manner that the grooves are cut by the elongated flat surfaces 5b, 5c.

Therefore, as shown in FIG. 3, also in inner spaces of the cylinder main body 2 and casing 3, a pair of elongated flat surfaces parallel to each other and a pair of elongated curved surfaces connecting the opposite end portions of the elongated flat surface are disposed. Furthermore, an opening in a stopper member 37 has a shape formed by a pair of elongated flat surfaces parallel to each other and a pair of elongated curved surfaces connecting the opposite end portions of the elongated flat surfaces. This stopper member 37 will be described later.

It is to be noted that the surfaces which connect the opposite end portions of the elongated flat surface 5b to those of the elongated flat surface 5c are not limited to the pair of elongated curved surfaces 5d, 5e, and may also be surfaces formed by a plurality of connected curved surfaces, surfaces formed by a plurality of connected flat surfaces, or surfaces formed by one or more curved surfaces connected to one or more flat surfaces.

The piston 7 has an annular groove portion 7a along a peripheral direction, and a piston ring 8 (seal ring) is disposed in the groove portion 7a to keep the piston 7 and cylinder 1 in an airtight manner. A gas chamber 10 between the piston 7 and gas generation section 4a in the cylinder 1 is kept in the airtight manner by the piston ring 8.

As shown in FIG. 1, the piston rod 5 is inserted in the cylinder 1 in such a manner that the rod is relatively movable in the axial line L direction together with the piston 7 in a state in which the tip cap 6 is exposed.

Figure 6:
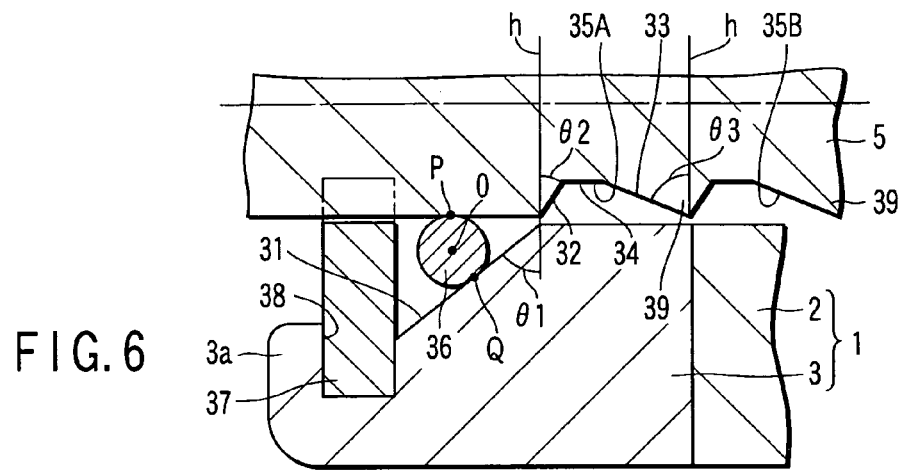
FIG. 6 is a sectional view showing the vicinity of a C ring of the actuator of FIG. 1 in a state in which the piston rod is inserted in the cylinder.
Figure 7:
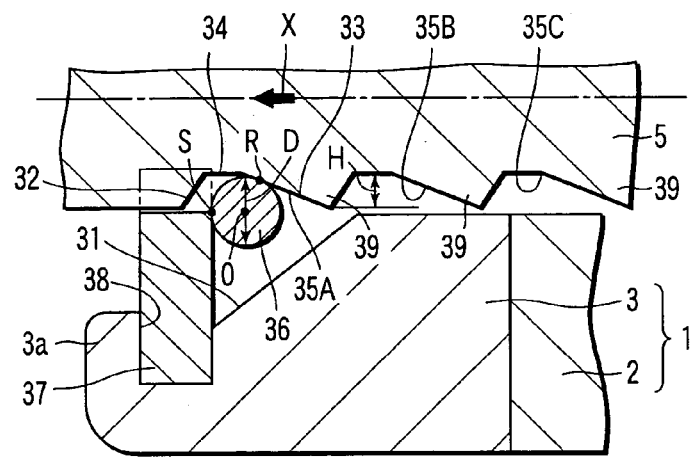
FIG. 7 is a sectional view showing the actuator of FIG. 1 in the vicinity of the C ring in a state in which the piston rod protrudes from the cylinder and is being locked by a locking mechanism.
Figure 8:
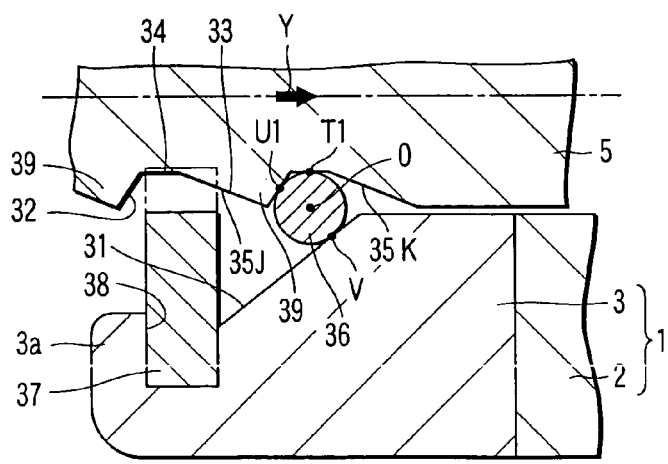
FIG. 8 is a sectional view showing the actuator of FIG. 1 in the vicinity of the C ring in a state in which the piston rod is locked by the locking mechanism.

As shown in FIGS. 6 to 8, the locking mechanism 30 comprises the casing 3 having a first tapered surface 31, a plurality of locking grooves 35A to 35K having second tapered surfaces 32, a C ring 36 which is a locking member and the like. It is to be noted that the locking member is not limited to the C ring 36.

The first tapered surface 31 is disposed on the inner surface of the cylinder 1. In the embodiment, the first tapered surface 31 is disposed along the peripheral direction on the inner surface of the casing 3 forming a part of the inner surface of the cylinder 1. The first tapered surface 31 is inclined so as to enlarge and open toward the front end of the cylinder 1.

Each of the plurality of (e.g., eleven in the embodiment) locking grooves 35A to 35K has the second tapered surface 32 inclined so as to enlarge and open toward the front end of the piston rod 5, a third tapered surface 33 inclined so as to enlarge and open toward the rear end of the piston rod 5, and an annular flat surface 35 which connects the second tapered surface 32 to the third tapered surface 33. It is to be noted that the surface connecting the second tapered surface 32 to the third tapered surface 33 may also be a curved surface.

These locking grooves 35A to 35K are arranged in the piston rod 5 so as to extend in parallel to one another along the axial line L direction. Therefore, cross sections of the rod main body 5a extending substantially parallel to the elongated flat surfaces 5b, 5c substantially have saw-teeth shapes. The respective second tapered surfaces 32 are disposed so as to extend in parallel with one another along the axial line L direction. In this embodiment, as shown in FIGS. 1 and 2, the locking grooves 35A, 35B, 35C, . . . 35K are arranged in order from the front end of the piston rod 5. It is to be noted that the number of locking grooves is optional.

Moreover, as shown in FIG. 6, assuming that a segment crossing the axial line L at right angles is a normal h, an angle formed by the first tapered surface 31 and the normal h is an inclination angle $\theta 1$ of the first tapered surface 31, an angle formed by the second angle $\theta 2$ of the second tapered surface 32, and an angle formed by the third tapered surface 33 and the normal h is an inclination angle $\theta 3$ of the third tapered surface 33, the first to third tapered surfaces 31 to 33 are designed so as to have a relation of $\theta 3 > \theta 1 > \theta 2$ in the locking mechanism 30.

The C ring 36 having a substantially round cross section is positioned between the piston rod 5 and the first tapered surface 31 of the cylinder 1, and is stored in the casing 3. As shown in FIG. 7, a section diameter D of the C ring 36 is substantially twice a depth H of each of the locking grooves 35A to 35K. It is to be noted that a character 0 in the drawing indicates a center of the round section of the C ring 36.

Moreover, the diameter of the C ring 36 is set in such a manner that the ring fits into the locking grooves 35A to 35K. Therefore, in an initial state in which the piston rod 5 is inserted in the cylinder 1, as shown in FIG. 4, the C ring 36 has an enlarged diameter elastically pushed/enlarged by the outer surface of the front end portion of the piston rod 5 formed in a diameter larger than that of each of the locking grooves 35A to 35K. Moreover, the C ring 36 is shifted, fitted, and fixed in a tip in the front end portion of the piston rod 5.

Furthermore, in The casing 3, the annular stopper member 37 is disposed to prevent the C ring 36 from being detached from the piston rod 5 and coming out of a front opening in the casing 3. The stopper member 37 is disposed in such a manner that the segment crossing the axial line L at right angles extends substantially in parallel with the normal h. In the casing 3, an annular groove portion 38 is disposed so as to continue to a front edge of the first tapered surface 31, and the stopper member 37 is fitted in the groove portion 38. The stopper member 37 is caulked by turning and bending a tip portion 3a of the casing 3 inwards.

A method of assembling the actuator 40 will be described with reference to FIGS. 1 to 3.

The piston rod 5 is inserted in the cylinder main body 2. The first tapered surface 31 and groove portion 38 are formed beforehand in the casing 3. The stopper member 37 is fitted into the groove portion 38 of the casing 3. The tip portion 3a of the casing 3 is bent inwards so as to cross the axial line L substantially at right angles, and the stopper member 37 is accordingly caulked.

While the C ring 36 is elastically deformed in a diameter expanding direction, the C ring 36 is fitted in the piston rod 5. The piston rod 5 is stored in the cylinder main body 2. The casing 3 is attached to the cylinder main body 2. Accordingly, the C ring 36 is stored in the casing 3.

The tip cap 6 is attached to the front end portion of the piston rod 5. The gas generation device 4 is disposed on the rear end portion of the cylinder main body 2, and is fixed to the cylinder main body 2 by the support member 9.

In this manner, since the cylinder 1 comprises the casing 3 having the first tapered surface 31, the first tapered surface 31 and stopper member 37 can be formed in a unit by the casing 3. Therefore, the locking mechanism 30 can be easily disposed in the actuator 40. Additionally, it is also easy to assemble the actuator 40 itself.

The actuator 40 of the embodiment operates as follows.

When the piston rod 5 is inserted in the cylinder 1, as shown in FIG. 6, the C ring 36 is elastically deformed in the diameter expanding direction, and is fitted in the front end portion of the piston rod 5 on a tip side from the locking groove 35A. It is to be noted that at this time the C ring 36 contacts the front end portion of the piston rod 5 in a position P in FIG. 6, and contacts the first tapered surface 31 of the cylinder 1 in a position Q in FIG. 6.

When a current is supplied to a gas generation body via the lead wire 4b, the gas generation body is ignited. When the gas generation body is ignited, the gas generation body is rapidly burnt, and gas is ejected into the gas chamber 10. Accordingly, since a pressure in the gas chamber 10 rises, the piston 7 moves in a direction protruding before the cylinder 1 (direction shown by an arrow X in FIG. 7) together with the piston rod 5.

When the piston rod 5 is pushed forwards until the locking groove 35A reaches the position of the C ring, the diameter of the C ring 36 is reduced, and the ring fits in the locking groove 35A. Moreover, the C ring 36 fitted in the locking groove 35A is pushed forwards together with the piston rod 5.

Additionally, since the stopper member 37 is disposed in the vicinity of the front opening in the casing 3, the C ring 36 contacts the stopper member 37 in a position 5 shown in FIG. 7, and the forward movement is inhibited. Therefore, even when the piston rod 5 further moves forwards, the C ring 36 is pushed backwards by the stopper member 37 to remain in the position, and is therefore prevented from being pushed outwards from the front opening of the casing 3.

Therefore, when the piston rod 5 moves forwards, the C ring 36 contacts the third tapered surface 33 in a position R shown in FIG. 7. Subsequently, the ring slides backwards on the third tapered surface 33, the diameter of the ring is enlarged along the stopper member 37, and the ring rides on a protruding portion 39 between the locking grooves 35A and 35B to fit into the locking groove 35B.

When an inner pressure of the gas chamber 10 is still sufficiently high, a force continues to be applied to the piston rod 5 from a direction shown by an arrow X in FIG. 7. Therefore, the C ring 36 successively rides on the protruding portion 39 between the locking grooves 35B and 35C, and the protruding portion 39 between the locking grooves 35C and 35D in the same manner as described above, and the piston rod 5 protrudes from the tip of the cylinder 1.

Moreover, as shown in FIG. 8, when the piston rod 5 completely protrudes from the front end of the cylinder 1 (the piston rod 5 is moved with a full stroke), the C ring 36 is held between the first tapered surface 31 and the second tapered surface 32 of the locking groove 35K, and the relative movement of the piston rod 5 with respect to the cylinder 1 is locked. At this time, the C ring 36 contacts the first tapered surface 31 of the cylinder 1 in a position V shown in FIG. 8, contacts an annular flat surface 34 of the locking groove 35K of the piston rod 5 in a position T shown in FIG. 8, and contacts the second tapered surface 32 of the locking groove 35K in a position U shown in FIG. 8.

Moreover, even when the piston rod 5 stops before moving with the full stroke in the actuator 40 of the embodiment, the C ring 36 is held between the first tapered surface 31 and the second tapered surface 32 of any of the plurality of locking grooves 35A to 35J (the locking groove facing the C ring 36, or the locking groove positioned in the most vicinity of the C ring 36). Therefore, the C ring 36 is held between the first tapered surface 31 and the second tapered surface 32 of the locking groove 35K to lock the relative movement of the piston rod 5 with respect to the cylinder 1. Similarly, the relative movement of the piston rod 5 with respect to the cylinder 1 is locked in the vicinity of a position where the piston rod 5 has stopped.

As described above, according to the actuator 40 of the embodiment, the locking mechanism 30 comprises: the first tapered surface 31 provided on the inner surface of the cylinder 1 and so inclined that the inside diameter of the cylinder 1 gradually increases toward the front of the cylinder 1; a plurality of second tapered surfaces 32 arranged in the axial direction of the piston rod 5 and parallel to one another, each second tapered surface 32 being so inclined that the diameter of the piston rod 5 gradually increases to the front of the piston rod 5; and the C ring 36 which is the locking member held between the first tapered surface 31 and one of the plurality of second tapered surfaces 32 to lock the relative movement of the piston rod 5 with respect to the cylinder 1. Therefore, the piston rod 5 can be locked in a multi-step positions. Therefore, even when the piston rod 5 is not moved with the full stroke in the actuator 40, the relative movement of the piston rod 5 with respect to the cylinder 1 can be locked in the vicinity of the position where the piston rod 5 has stopped.

Moreover, the cylinder 1 has the hollow casing 3 in the front end, and the first tapered surface 31 is disposed on the inner surface of the casing 3. The C ring 36 which is the locking mechanism is stored in the casing 3. Since a part of the locking mechanism 30 can be formed in a unit in this constitution, the locking mechanism 30 can be easily assembled into the actuator 40.

Furthermore, by the use of the C ring 36 as the locking member, the locking mechanism 30 can be inexpensively realized with a simple constitution. The diameter of the ring is reduced in such a manner that the ring contacts the second tapered surface 32, when one end of the piston rod 5 is protruded from one end of the cylinder 1.

A second embodiment of the present invention will be described hereinafter with reference to FIG. 9.

In this embodiment, an inclined portion 37a inclined rearwards/inwards from a front outer side is disposed on an inner edge of the stopper member 37. For example, the stopper member 37 can be bent to form the inclined portion 37a integrally. It is to be noted that the other constitution is the same as that of the first embodiment including not-shown parts, and is therefore denoted with the same reference numerals in the drawing to omit redundant description.

The piston rod 5 is protruded from the front end of the cylinder 1 as smoothly as possible in the actuator 40 applied to a hood device 70, seat device 80 or the like described later. For this purpose, the C ring 36 needs to enlarge its diameter and to ride over each protruding portion 39 as smoothly as possible.

According to the embodiment, when the pressure in the gas chamber 10 rises, and the piston 7 moves in a forward protruding direction of the cylinder 1 (direction shown by an arrow X in FIG. 9) together with the piston rod 5, the C ring 36 reduces its diameter to fit into the locking groove 35A. The C ring 36 which has reduced its diameter to fit in the locking groove 35A moves forwards together with the piston rod 5, and contacts the inclined portion 37a of the stopper member 37 in a position S1 shown in FIG. 9. When the piston rod 5 further moves forwards, the C ring 36 is pushed backwards by the stopper member 37 so as to contact the second tapered surface 32 in the position S1 in FIG. 9.

Since the inclined portion 37a is included backwards/inwards from the front outer side, the C ring 36 enlarges its diameter backwards/inwards from the front outer side along the inclined portion 37a, and rides over the protruding portion to fit into the locking groove 35B.

Thereafter, the C ring 36 successively rides on the protruding portion 39 between the locking grooves 35B and 35C and the protruding portion 39 between the locking grooves 35C and 35D, and the piston rod 5 protrudes from the tip of the cylinder 1.

When the C ring 36 is slid backwards/inwards from the front outer side along the inclined portion 37a to enlarge its diameter, the C ring 36 can easily enlarge its diameter and smoothly ride over the protruding portion as compared with a case where the diameter of the C ring 36 is enlarged along the stopper member 37 disposed substantially in parallel with the normal h as in the first embodiment.

As described above, according to the preset embodiment, when the inclined portion 37a inclined backwards/inwards from the front outer side is disposed on the inner edge of the stopper member 37, the C ring 36 can smoothly enlarge its diameter. Therefore, an unlocking property is enhanced, and the piston rod 5 can be smoothly protruded from the cylinder 1.

A third embodiment of the present invention will be described hereinafter with reference to FIG. 10.

In the embodiment, the cylinder 1 in which the cylinder main body 2 is integrated with the casing 3 is used. It is to be noted that the other constitution is the same as that of the first embodiment including the not-shown parts, and is therefore denoted with the same reference numerals in the drawing to omit the redundant description.

According to the embodiment, since the cylinder main body 2 is integrated with the casing 3, members constituting the actuator can be reduced.

A fourth embodiment of the present invention will be described hereinafter with reference to FIG. 11.

In the embodiment, a plurality of, for example, two C rings 36, 36 are disposed as the locking members. A pitch N1 between the C rings 36, 36 is set to be substantially equal to a pitch N2 of the locking grooves 35A to 35K.

Moreover, in the embodiment, the cylinder main body 2 is integrated with the casing 3, but the cylinder main body 2 may also be disposed separately from the casing 3. It is to be noted that the other constitution is the same as that of the first embodiment including the not-shown parts, and is therefore denoted with the same reference numerals in the drawing to omit the redundant description.

According to the embodiment, since a plurality of C rings 36, 36 are disposed, a locking strength can be enhanced.

Figure 12:
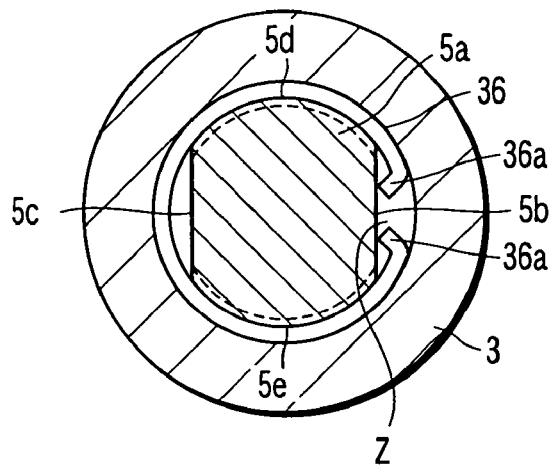
FIG. 12 is a transverse sectional view of the actuator in the vicinity of the C ring according to a fifth embodiment of the present invention.

A fifth embodiment of the present invention will be described hereinafter with reference to FIG. 12.

In the embodiment, protrusions 36a protruding toward a center of a circle imagined by the C ring 36 are disposed on the opposite end portions of the C ring 36. The C ring 36 can be bent inwards to form these protrusions 36a integrally with the C ring 36. It is to be noted that the other constitution is the same as that of the first embodiment including the not-shown parts, and is therefore denoted with the same reference numerals in the drawing to omit the redundant description.

Additionally, when a slit position Z of the C ring 36 shifts in an elongated curved surface 5d or 5e direction, the locking strength is considered to drop. On the other hand, according to the embodiment, since the protrusions 36a are caught by corner portions of the elongated flat surfaces 5b, 5c and the elongated curved surfaces 5d, 5e, the slit position Z of the C ring 36 does not easily shift from the pair of the elongated flat surfaces 5b. Therefore, according to the embodiment, a stable locking strength can be obtained.

A sixth embodiment of the present invention will be described hereinafter with reference to FIGS. 13 and 14.

Figure 13:
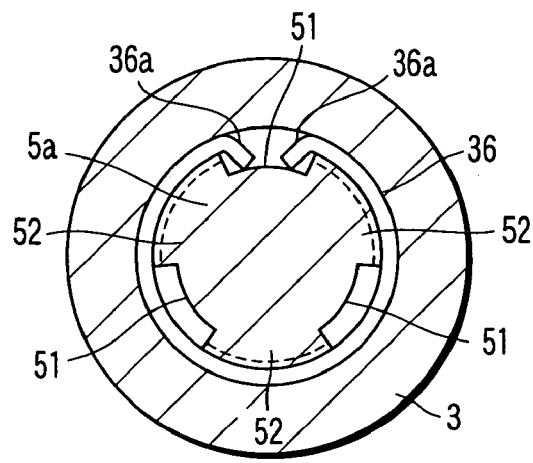
FIG. 13 is a transverse sectional view of the actuator in the vicinity of the C ring according to a sixth embodiment of the present invention.
Figure 14:
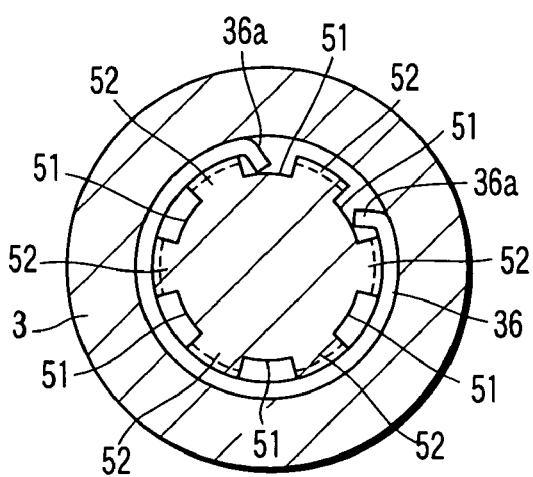
FIG. 14 is a transverse sectional view of the actuator in the vicinity of the C ring according to another mode of the sixth embodiment of the present invention.

In the embodiment, as shown in FIG. 13, the piston rod 5 (rod main body 5a) has at least one, for example, three groove portions 51 disposed along the axial direction in an outer periphery. That is, the piston rod 5 has three keys 52. A plurality of locking grooves 35A, 35B, . . . are disposed in regions facing keys 52.

The number of groove portions 51, that is, the number and shapes of the keys 52 are optional. For example, as shown in FIG. 14, three or more, for example, six groove portions 51 (six keys 52) may also be disposed. Three or less groove portions 51 may also be disposed. It is to be noted that the other constitutions are the same as those of the first and fifth embodiments including the not-shown parts, and are therefore denoted with the same reference numerals in the drawing to omit the redundant description.

When the piston rod 5 is protruded from the tip of the cylinder 1, a force is applied outwards from the third tapered surface 33 in a position facing the key 52, and the C ring 36 enlarges its diameter. Therefore, in the embodiment, a force for enlarging the diameter of the C ring 36 can be equally applied to the C ring 36 in a peripheral direction as compared with the first embodiment. Therefore, the unlocking property is enhanced, and the piston rod 5 can be smoothly protruded from the cylinder 1.

The actuator 40 of these embodiments is preferably usable, for example, in the hood device 70, seat device 80 or the like described later (see FIGS. 15 and 16).

Figure 15:
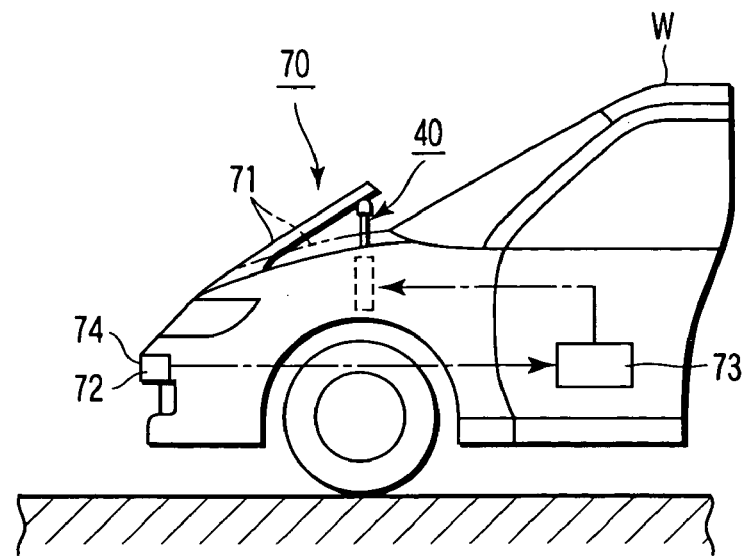
FIG. 15 is a side view showing a hood device provided with the actuator of FIG. 1.

FIG. 15 shows the hood device 70 provided with the actuator 40 of the first embodiment. A travel direction of a vehicle will be described as a forward direction hereinafter. It is to be noted that the actuator 40 of the second to seventh embodiments may also be used in the hood device 70.

The hood device 70 can be applied, for example, to a hood 71 openably/closably disposed so as to cover an engine room disposed in a front part of a car W. The hood device 70 comprises a collision detection sensor 72, control section 73, and actuator 40.

The collision detection sensor 72 detects collision between a car body and a pedestrian, and is disposed in a front bumper 74. The actuator 40 is disposed under the hood 71 in a state in which the tip of the piston rod 5 is directed upwards. When the collision detection sensor 72 detects the collision, the control section 73 passes a current to the lead wire 4b.

When the car W collides with the pedestrian, and the collision detection sensor 72 operates in the hood device 70 constituted in this manner, the actuator 40 is linked with the hood device to operate. When the tip portion of the cylinder 1 to push up the hood 71 by a predetermined amount, a gap is made between the hood 71 and each device in the engine room. Therefore, when the pedestrian is thrown up to collide with the hood 71, the hood 71 can be deformed to absorb a part of energy by impact.

Additionally, even when the piston rod 5 is not moved with the full stroke, the hood device 70 can be locked in the vicinity of a position where the piston rod 5 has stopped. That is, the device comprises the actuator 40 which can be locked in a multi-stage position.

Therefore, in cases where an input load is large with respect to an operation power of the gas generation device 4 and the piston rod 5 is not moved with the full stroke such as a case where a collision speed is high or a crew's weight is heavy, the relative movement with respect to the cylinder 1 is locked in the vicinity of the position where the piston rod 5 has stopped. Therefore, the hood 71 can be held while pushed up.

Figure 16:
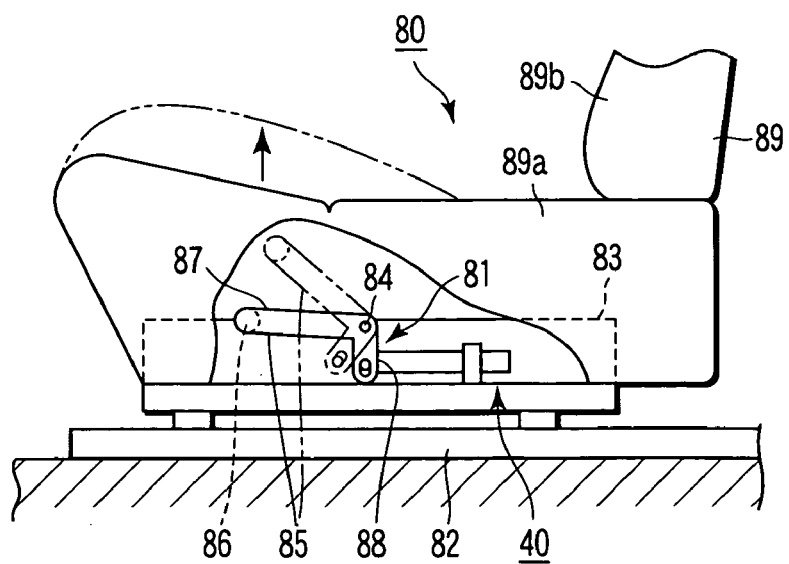
FIG. 16 is a side view showing the hood device provided with the actuator of FIG. 1 in a partly cut state.

FIG. 16 shows the seat device 80 provided with the actuator 40 of the first embodiment. The travel direction of the vehicle will be described hereinafter as the forward direction. It is to be noted that the actuators 40 of the second to seventh embodiments may also be used in the seat device 80.

This seat device 80 is applicable, for example, to the car W (see FIG. 15). The seat device 80 comprises a seat main body 89 including a seat portion 89a and a back portion 89b, the collision detection sensor 72, the control section 73, a link mechanism 81, and the actuator 40.

A seat frame 83 slidable in a front/back direction is disposed on a seat rail 82 fixed to a car body. The seat frame 83 is fixed in a desired position by a locking mechanism (not shown). The link mechanism 81 is rotatably disposed in the seat frame 83 via a support portion 84. The link mechanism 81 comprises, for example, a pair of link members 85 (only one member is shown), and a connection portion 86 which connects these link members 85 to each other.

The link member 85 has a long portion 87 and a short portion 88 which cross each other substantially at right angles, and is formed substantially in an L shape. The other link member 85 has only the long portion 87 and is formed in an I shape (not shown). The link member 85 is supported by the support portion 84 in an intersection between the long portion 87 and short portion 88, that is, in a corner portion. One end portion of the other link member 85 is supported by the seat frame 83. Moreover, the end portion of the link member 85 on a long portion 87 side is connected to the other end portion of the other locking member via the connection portion 86. The end portion of the link member 85 on a short portion 88 side is connected to the piston rod 5 of the actuator 40. The control section 73 passes a current through the lead wire 4b, when the collision detection sensor 72 detects the collision.

When the car W collides and the collision detection sensor 72 operates in the seat device 80 constituted in this manner, the actuator 40 is linked to operate. When the piston rod 5 moves in the protruding direction from the tip portion of the cylinder 1, the link member 85 rotates in a position shown by a two-dot chain line from a position shown by a solid line in FIG. 16, and the tip portion of the seat portion 89a is mechanically lifted up by the connection portion 86 extending in the width direction of the seat portion 89a of the seat main body 89. Therefore, a so-called submarine phenomenon can be suppressed in the seat device 80.

Additionally, even when the piston rod 5 is not moved with the full stroke, the seat device 80 can be locked in the vicinity of the position where the piston rod 5 has stopped. That is, the device comprises the actuator 40 which can be locked in the multi-stage position.

Therefore, in the cases where the input load is large with respect to the operation power of the gas generation device 4 and the piston rod 5 is not moved with the full stroke such as the case where the collision speed is high or the crew's weight is heavy, the relative movement with respect to the cylinder 1 is locked in the vicinity of the position where the piston rod 5 has stopped. Therefore, the tip portion of the seat portion 89a can be held while pushed up.

Moreover, the actuator of the present invention is broadly applicable not only to the hood device 70 and seat device 80 but also to various devices. The actuator of the present invention is applicable, for example, to a buckle pretensioner device including an actuator for drawing a buckle in a tense direction of a seat belt, a seat device comprising the buckle pretensioner device, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An actuator comprising:
a hollow cylinder;
a piston rod which is formed in a diameter smaller than an inner diameter of the cylinder and which is inserted into the cylinder in such a manner that relative movement is possible in an axial direction of the cylinder; and
a locking mechanism which locks the relative movement of the piston rod with respect to the cylinder in a state in which one end of the piston rod protrudes from one end of the cylinder,
wherein
the locking mechanism comprises:
a first surface provided on an inner surface of the cylinder and so inclined that the inside diameter of the cylinder gradually linearly increases toward one end the cylinder;
a plurality of second surfaces arranged in an axial direction of the piston rod and parallel to one another, each second surface being so inclined that the diameter of the piston rod gradually linearly increases to said one end of the piston rod; and
a locking member held between the first surface and any one of the second surfaces to lock the relative movement of the piston rod with respect to the cylinder.

2. The actuator according to claim 1, wherein the cylinder has a hollow casing in said one end portion, the first surface is disposed on the inner surface of the casing, and the locking member is stored in the casing.

3. The actuator according to claim 2, wherein the locking member is at least one C ring which reduces its diameter so as to contact any one of the second surfaces, when said one end of the piston rod is protruded from said one end of the cylinder.

4. The actuator according to claim 2, wherein the piston rod includes a pair of elongated flat surfaces disposed along the axial direction and extending in parallel with each other.

5. The actuator according to claim 2, wherein the piston rod includes at least one groove portion disposed along the axial direction.

6. The actuator according to claim 1, wherein the locking member is at least one C ring which reduces its diameter so as to contact any one of the second surfaces, when said one end of the piston rod is protruded from said one end of the cylinder.

7. The actuator according to claim 6, wherein the piston rod includes a pair of elongated flat surfaces disposed along the axial direction and extending in parallel with each other.

8. The actuator according to claim 6, wherein the piston rod includes at least one groove portion disposed along the axial direction.

9. The actuator according to claim 1, wherein the piston rod includes a pair of elongated flat surfaces disposed along the axial direction and extending in parallel with each other.

10. The actuator according to claim 1, wherein the piston rod includes at least one groove portion disposed along the axial direction.

* * * * *